(12) United States Patent
Hiza et al.

(10) Patent No.: US 10,963,225 B2
(45) Date of Patent: Mar. 30, 2021

(54) PROGRAM CREATION ASSISTING SYSTEM, METHOD FOR SAME, AND PROGRAM

(71) Applicant: OFFICE ZERO LIMITED LIABILITY COMPANY, Tokyo (JP)

(72) Inventors: Kenichi Hiza, Yokohama (JP); Akira Oki, Tokyo (JP)

(73) Assignee: OFFICE ZERO LIMITED LIABILITY COMPANY, Tokyo (JP)

( * ) Notice: Subject to any disclaimer, the term of this patent is extended or adjusted under 35 U.S.C. 154(b) by 0 days.

(21) Appl. No.: 17/032,203

(22) Filed: Sep. 25, 2020

(65) Prior Publication Data

US 2021/0011691 A1 Jan. 14, 2021

Related U.S. Application Data

(63) Continuation of application No. PCT/JP2018/041435, filed on Nov. 8, 2018.

(30) Foreign Application Priority Data

Mar. 27, 2018 (JP) .............................. JP2018-059677

(51) Int. Cl.
*G06F 3/01* (2006.01)
*G06F 9/54* (2006.01)
(Continued)

(52) U.S. Cl.
CPC .............. *G06F 8/34* (2013.01); *G06F 9/4843* (2013.01); *G06K 9/00671* (2013.01); *G09B 5/02* (2013.01);
(Continued)

(58) Field of Classification Search
CPC . G06F 8/34; G06F 9/4843; G06F 9/54; G06F 21/31; G06F 3/03; G06F 3/03;
(Continued)

(56) References Cited

U.S. PATENT DOCUMENTS 6,175,954 B1 * 1/2001 Nelson ...................... G06F 8/34
717/105
6,366,300 B1 * 4/2002 Ohara ................... G05B 19/056
700/83
(Continued)

FOREIGN PATENT DOCUMENTS

JP 6253170 B1 12/2017
WO 2018/007515 A1 1/2018

OTHER PUBLICATIONS

Marcia Alves, Robotic Simulator for the Tactode Tangible Block Programming System, Oct. 20, 2019 [Retrieved on Nov. 10, 2020]. Retrieved from the internet: <URL: https://www.semanticscholar.org/paper/Robotic-simulator-for-the-Tactode-tangible-block> 115 Pages (1-115) (Year: 2019).*

(Continued)

*Primary Examiner* — Anibal Rivera
(74) *Attorney, Agent, or Firm* — Mattingly & Malur, PC

(57) ABSTRACT

A program creation assisting system includes a camera that captures an image of a chip array in which a special chip indicating a task for programming is in a chip array, a task management table managed in a state where the task and an image of the plurality of chips used for the task are associated with each other, an image processing unit that recognizes an image relating to the chip from the image of the chip array acquired by the camera, and a program creation processing unit 103 that, when the image processing unit recognizes a special chip such as a start chip, selects a command corresponding to the image of the plurality of chips, which is recognized by the image processing unit, based on a task management table associated with a task of the special chip, and generates a program configured by a plurality of selected commands.

19 Claims, 12 Drawing Sheets

(51) Int. Cl.
*G06F 9/44* (2018.01)
*G06F 8/34* (2018.01)
*G06K 9/00* (2006.01)
*G09B 19/00* (2006.01)
*G09B 5/02* (2006.01)
*G06F 9/48* (2006.01)
*G06F 21/31* (2013.01)

(52) U.S. Cl.
CPC .......... *G09B 19/0053* (2013.01); *G06F 3/017* (2013.01); *G06F 9/54* (2013.01); *G06F 21/31* (2013.01); *G06K 9/00442* (2013.01); *G06K 2209/19* (2013.01)

(58) Field of Classification Search
CPC ................ G06F 3/017; G06K 9/00671; G06K 9/00442; G06K 2209/19; G09B 5/02; G09B 19/0053; G09B 19/056
See application file for complete search history.

(56) References Cited

U.S. PATENT DOCUMENTS

| | | | |
|---|---|---|---|
| 9,354,716 B1* | 5/2016 | Sharma | G06F 3/017 |
| 2014/0059569 A1* | 2/2014 | Hasegawa | G06F 9/54 |
| | | | 719/320 |
| 2015/0093033 A1* | 4/2015 | Kwon | G06K 9/00442 |
| | | | 382/195 |
| 2016/0054806 A1* | 2/2016 | Kosaka | G06F 21/31 |
| | | | 345/156 |
| 2016/0112279 A1* | 4/2016 | Kalanithi | G06F 3/03 |
| | | | 715/736 |
| 2016/0219168 A1* | 7/2016 | Shimada | H04N 1/00411 |
| 2019/0156698 A1* | 5/2019 | Kurowski | G06F 8/34 |

OTHER PUBLICATIONS

International Search Report of PCT/JP2018/041435 dated Jan. 8, 2019.

* cited by examiner

FIG. 4
401
4031
4032
4033
4034
4035
402
4036

FIG. 7

COMMAND LIST

DISPLAY AND MOTION

| REFERENCE No | CHIP | NAME | OPERATION | PARAMETER | NOTE |
|---|---|---|---|---|---|
| 1 | ▶ | MOVE: WITH DIRECTION | MOVE IN DESIGNATED DIRECTION | NUMBER OF TIMES | THERE IS EACH DIRECTION (UP, DOWN, RIGHT, AND LEFT) |
| 2 | → | MOVE | MOVE IN DIRECTED DIRECTION | NUMBER OF TIMES | |
| 3 | ↷ | ROTATE | ROTATE IN DESIGNATED DIRECTION | DIRECTION | DIRECTION IS DESIGNATED |
| 4 | ↥ | JUMP | JUMP | DIRECTION, HEIGHT | MOVE IN DESIGNATED DIRECTION + JUMP |
| 5 | ⊼ | PICK UP | PICK UP THING IN FRONT OF EYES | | |
| 6 | ⊻ | PLACE | PLACE HOLDING THING IN FRONT | | |
| 7 | ♥ | ACTION | PERFORM DESIGNATED ACTION | NUMBER | DESIGNATE ACTION BY NUMBER |
| 8 | ▯ | OPEN | OPEN THING IN FRONT | | USED IN DOOR, TREASURE BOX, OR LIKE |
| 9 | ☺ | APPEARANCE | CHANGE CHARACTER | NUMBER | CHANGE TO DESIGNATED CHARACTER |

CONTROL SENTENCE

| REFERENCE No | CHIP | NAME | OPERATION | PARAMETER | NOTE |
|---|---|---|---|---|---|
| 10 | ↻ | REPEAT | REPEAT COMMAND SUBSEQUENTIALLY | NUMBER OF TIMES, COMMAND | DESCRIBE COMMAND OF MOVING OR LIKE |
| 11 | ⊘ | WAIT | STOP FOR DESIGNATED TIME | TIME | DESIGNATED BY SEVERAL SECONDS |

INPUT AND OUTPUT

| REFERENCE No | CHIP | NAME | OPERATION | PARAMETER | NOTE |
|---|---|---|---|---|---|
| 12 | ☜ | UNTIL BEING TOUCHED | STOP UNTIL BEING TOUCHED | | SCREEN TOUCH, MOUSE CLICK, OR LIKE |
| 13 | ☟ | IF BEING TOUCHED | EXECUTE COMMAND IF BEING TOUCHED | COMMAND | SCREEN TOUCH, MOUSE CLICK, OR LIKE |
| 14 | 🔊 | SOUND | SOUND | SCALE, LENGTH | |
| 15 | 📼 | CONTROL CONNECTED DEVICE | OPERATE OPERATION DEVICE | | SEQUENTIALLY ADD |

PARAMETER

| REFERENCE No | CHIP | NAME | OPERATION | PARAMETER | NOTE |
|---|---|---|---|---|---|
| 16 | 1 | NUMBER | DESIGNATE NUMBER OF TIMES, HEIGHT, TYPE, OR LIKE | | 1 TO 9 |

OTHERS

| REFERENCE No | CHIP | NAME | OPERATION | PARAMETER | NOTE |
|---|---|---|---|---|---|
| 17 | START | START | BEGINNING OF PROGRAM | | |
| 18 | END | END | LAST OF PROGRAM | | |
| 19 | + | OPERATOR | FOR FOUR FUNDAMENTAL ARITHMETIC OPERATION | | |
| 20 | IF | CONDITIONAL SENTENCE | EXECUTE IN CONDITION | CONDITION, COMMAND | DETERMINE BY POSITION ON SCREEN OR LIKE |

FIG. 8

TASK MANAGEMENT TABLE 80

| ITEM | CONTENTS |
|---|---|
| TASK IDENTIFICATION INFORMATION | TASK NUMBER |
| APPLICATION | EXECUTION CONDITION OF APPLICATION |
| CHARACTER SET | CHARACTER TO BE USED |
| COMMAND SET | REFERENCE NUMBERS OF ALL COMMANDS TO BE USED |

FIG. 9

USER MANAGEMENT TABLE 90

| ITEM | CONTENTS |
|---|---|
| USER IDENTIFICATION INFORMATION | USER IDENTIFICATION ID |
| NAME | NAME OF USER |
| PROGRAM-DATA STORING DESTINATION | PROGRAM-DATA STORING DESTINATION ADDRESS |
| TASK IDENTIFICATION INFORMATION | TASK NUMBER TO BE USED |
| DATE AND TIME | UPDATE DATE |
| INDIVIDUAL INFORMATION | MAIL ADDRESS AND OTHERS |

FIG. 10

PROGRAM MANAGEMENT TABLE 100

| ITEM | CONTENTS |
|---|---|
| USER IDENTIFICATION INFORMATION | USER IDENTIFICATION ID |
| TASK IDENTIFICATION INFORMATION | TASK NUMBER |
| PROGRAM | CREATED PROGRAM DATA |
| PROGRAM-DATA STORING DESTINATION | PROGRAM-DATA STORING DESTINATION ADDRESS |
| REGISTRATION DATE AND TIME | PROGRAM REGISTRATION DATE AND TIME |
| CORRECTION DATE AND TIME | PROGRAM CORRECTION DATE AND TIME |

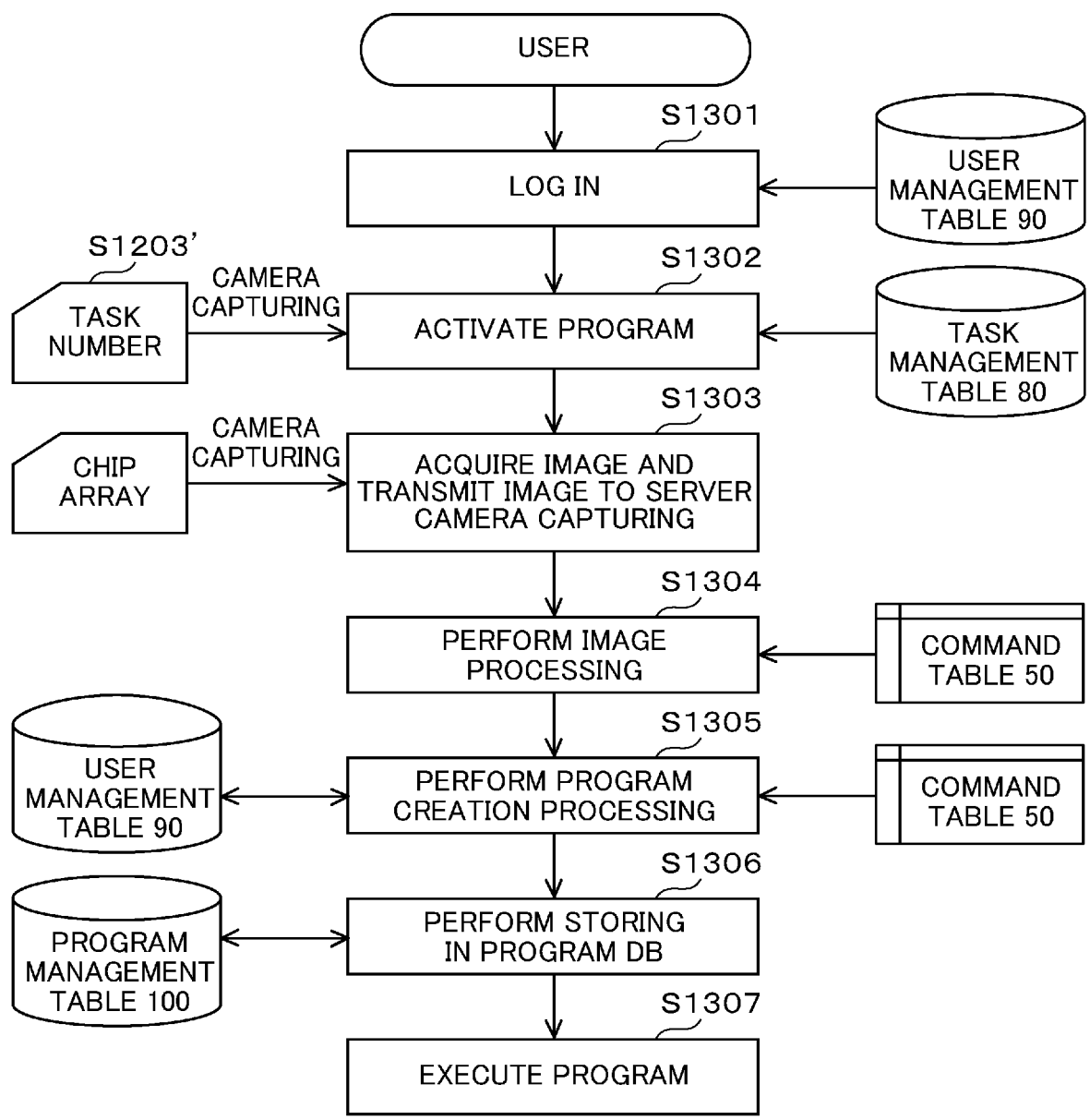
F I G. 1 2

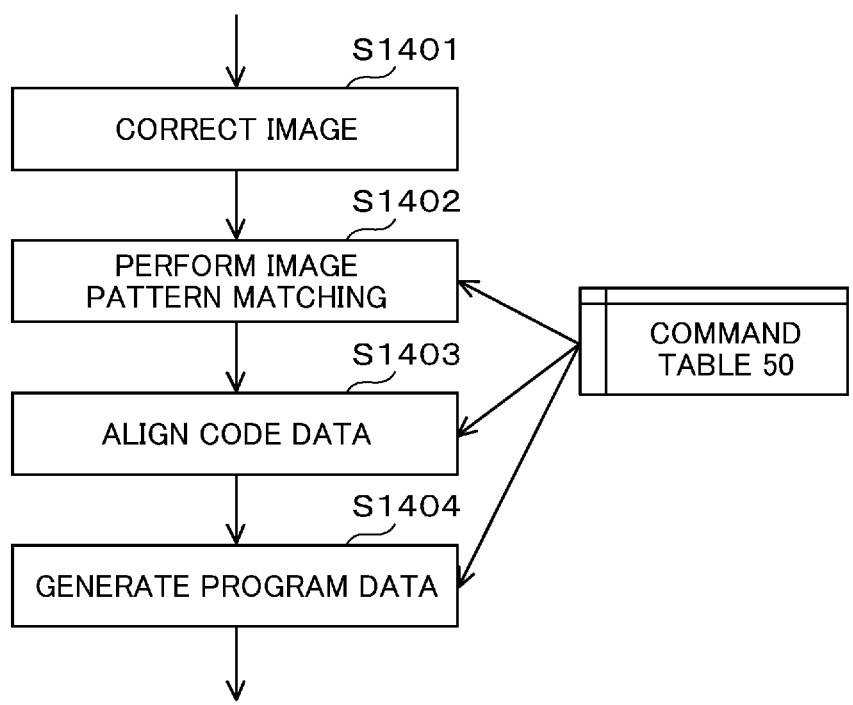
F I G. 1 3

US 10,963,225 B2

PROGRAM CREATION ASSISTING SYSTEM, METHOD FOR SAME, AND PROGRAM

CROSS-REFERENCE TO RELATED APPLICATION

This application is a continuation application of PCT/JP2018/041435, filed on Nov. 8, 2018, which claims the benefit of priority of Japanese Patent Application No. 2018-059677 filed on Mar. 27, 2018, the entire contents of which are incorporated herein by reference.

TECHNICAL FIELD

The present invention relates to a program creation assisting system, a method for the same, and a program, particularly, to a technology for assisting program creation suitable for programming learning of a beginner.

BACKGROUND ART

With the development of artificial intelligence (AI) and information technology (IT), the importance of training talented people for programming has been emphasized. In Japan, the Ministry of Education, Culture, Sports, Science and Technology has proposed the importance of programming education for children as one of the measures for training talented people for programming, and the programming education has become essential in elementary schools since 2020. Various systems, educational tools, toys, and the like for the programming education for children have already been proposed.

The applicant has proposed, in Patent Document 1, a new method for causing children to learn programming easier and cheaper. Patent Document 1 discloses a program creation assisting system and a method for the same for generating a program configured by a plurality of commands in a manner that a plurality of chips each having a unique pattern are arranged on a sheet, an image of an array of the chips is captured by a camera, the obtained image of the pattern is recognized, and a command associated with the pattern is specified.

CITATION LIST

Patent Document

Patent Document 1: JP 6253170 B1 (issued on Dec. 27, 2017)

SUMMARY OF THE INVENTION

Problems to be Solved by the Invention

The inventors have noticed a new problem at the stage of developing a programming method for children. That is, the programming method disclosed in Patent Document 1 is based on the premise that a plurality of chips with a unique pattern are arranged on a sheet and the image of the array of the chips is captured by a camera. However, if children are caused to arrange a plurality of chips on a sheet, the array of the chips may be out of the sheet without being fit in the sheet in many cases. Further, the number of chips increases if creation of a more advanced program is intended. Thus, the array of the chips may not be fit in one sheet. Therefore, a new mechanism that enables programming even though the array of chips becomes long is desired. Although Patent Document 1 discloses that an image of the chips is obtained based on the array of chips even though there is no sheet, this is just an idea, and specific realization means has not been examined.

For example, in the programming method disclosed in Patent Document 1, the system obtains curriculum identification information as a programming theme, from an identification portion 305 provided on a sheet 30. Therefore, simply if the sheet 30 is not used, it is not possible to obtain the curriculum identification information, and the problem still remains. Thus, the inventors have also examined a manner of obtaining the curriculum identification information.

An object of the present invention is to enable creation of a program corresponding to a task even though there is no sheet for a chip array.

Further, another object of the present invention is to identify a task as a theme of programming and to create a program by a simple method.

Solutions to Problems

In a preferred example of a program creation assisting system according to the present invention, a program creation assisting system for creating a program using a computer system includes a camera that captures an image of a chip array in which a special chip indicating a task for programming is included and arranged in a chip array formed by an array of a plurality of chips having visual characteristics, a task management table managed in a state where the task and an image of the plurality of chips used for the task are associated with each other, an image processing unit that recognizes the image relating to the chip, from the image of the chip array, which is acquired by the camera, and a program creation processing unit that, when the image processing unit recognizes the special chip, selects a command corresponding to the image of the plurality of chips, which is recognized by the image processing unit, based on the task management table associated with the task of the special chip, and generates a program configured by a plurality of selected commands.

In addition, in another preferred example of the program creation assisting system according to the present invention, a program creation assisting system for creating a program using a computer system includes a task sheet that is for assigning a task for programming and has display of identification information unique to the task, a camera that captures an image of the display of the sheet and captures an image of a chip array formed by an array of a plurality of chips having visual characteristics, a task management table managed in a state where the task and an image of the plurality of chips used for the task are associated with each other, an image processing unit that recognizes the image relating to the chip, from the image of the chip array, which is acquired by the camera, and a program creation processing unit that designates the task management table corresponding to the task based on the identification information of the display acquired by the camera, selects a command corresponding to the image of the plurality of chips, which is recognized by the image processing unit, based on the designated task management table, and generates a program configured by a plurality of selected commands.

In addition, the present invention is configured as a program creation assisting method and a program for assisting program creation, which are realized by the program creation assisting system.

Effects of the Invention

According to the present invention, it is possible to create a program corresponding to a task even though there is no sheet for a chip array. In addition, it is possible to identify a task as a theme of programming and to create a program by a simple method.

BRIEF DESCRIPTION OF THE DRAWINGS

FIG. 4 is a diagram illustrating an example of a chip and an array of the chip.

FIG. 7 is a diagram showing an example of a configuration of a command table.

FIG. 8 is a diagram showing an example of a configuration of a task management table.

FIG. 9 is a diagram showing an example of a configuration of a user management table.

FIG. 10 is a diagram showing an example of a configuration of a program management table.

FIG. 12 is a flowchart illustrating a processing operation of the program creation.

FIG. 13 is a flowchart illustrating the processing operation of the program creation.

MODE FOR CARRYING OUT THE INVENTION

A preferred example of a program creation assisting system according to the present invention is realized using a computer system including a server and a portable terminal. Firstly, a task sheet in which a task (which may be called curriculum or questions) for program creation is described is prepared. Display of identification information unique to the task is given to the task sheet. Further, a plurality of chips with a character or a pattern are prepared. The plurality of chips includes a start chip, an end chip, and a plurality of chips for defining an operation and the like of a program. Preferably, identification information (task identification information) unique to a task is given to the start chip as a special chip. A task management table managed in a state where an image of a chip corresponding to a task and a command are associated with each other is prepared.

A user arranges a plurality of chips with the start chip at the beginning and the end chip at the end to form a chip array, in accordance with a task described in the task sheet. A camera in the portable terminal captures an image of the chip array. For example, a processing device in the server or a processor in the portable terminal recognizes an image of a character or a pattern of a plurality of chips, which is acquired by the camera, to specify command codes forming a program and create program data from an array of the command codes. As one feature, task identification information is recognized from an image of the start chip, a task management table is specified, an image of a pattern of a plurality of chips arranged between the start chip and the end chip is recognized, and thus a command code forming a program is selected. The created program data is transmitted to the portable terminal and then executed. For example, the processor in the portable terminal executes the created program to display the form on a screen of a display unit as a motion image of a character.

Example 1

An example of the present invention will be described below in detail with reference to the drawings.

Figure 1:
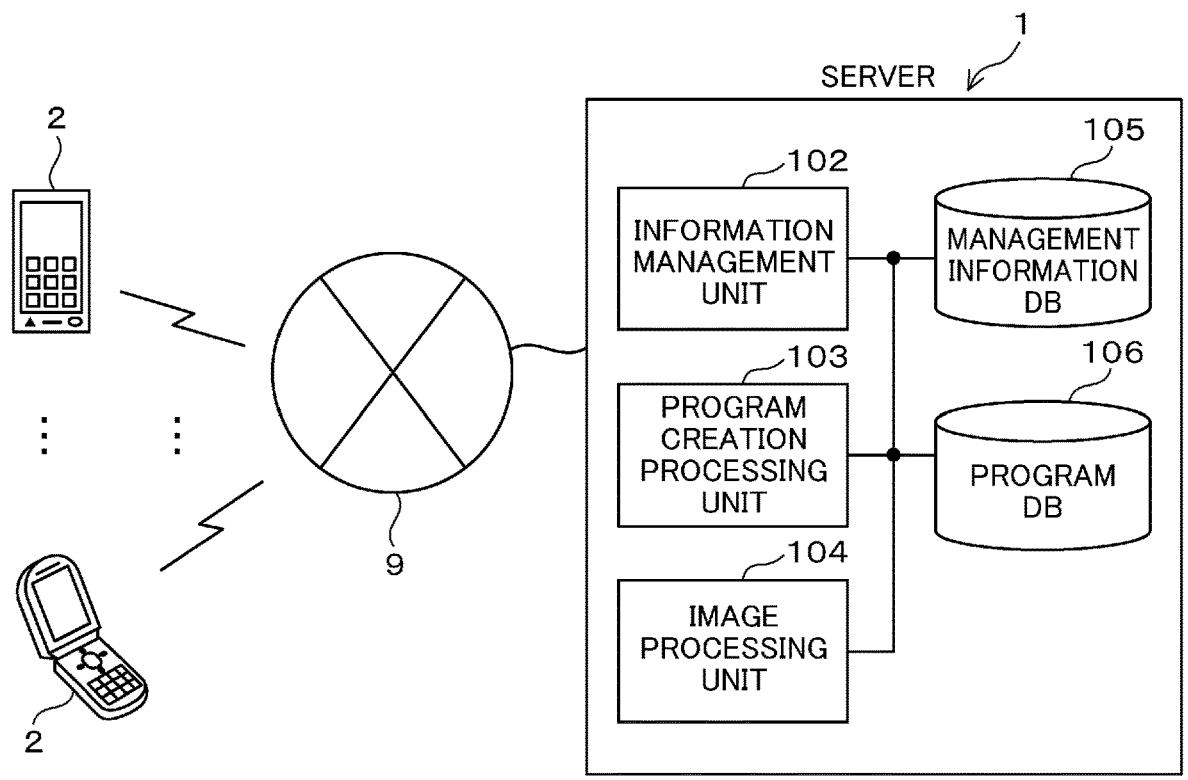
FIG. 1 is a diagram illustrating a configuration of a program creation assisting system according to Example 1.

FIG. 1 illustrates an example of an overall configuration of a program creation assisting system.

The program creation assisting system is realized in a computer system configured in a manner that a server 1 that assists creation of a program and a plurality of portable terminals 2 used by users are connected to each other via a communication network 9.

The server 1 is a computer that performs various types of data processing, for example, management of user information, data communication with the portable terminal, and creation and execution of a program. Details of the function and the processing will be described later. Note that, a hardware configuration of the server 1 is not illustrated. However, the server 1 has hardware resources, for example, a processing device (processor) that executes a program, a memory, an external storage device such as a hard disk, an input device, and a display device.

In order to assist creation of a program, the server 1 includes an information management unit 102, a program creation processing unit 103, and an image processing unit 104. The information management unit 102 registers and processes management information of a user or a program relating to program creation. The program creation processing unit 103 creates a program. The image processing unit 104 recognizes an image of the chip when a program is created. In addition, as a database (DB), the server 1 includes a management information DB 105 and a program DB 106. In the management information DB 105, user information or various types of management information regarding use of programming learning are registered. In the program DB 106, information regarding program creation is stored. The configurations and the functions of the processing units and the DBs will be described later in detail. Note that, the management information DB 105 and the program DB 106 are configured as separate DBs in the illustrated example, but may be configured by one DB.

The server 1 has a site for assisting program creation. The portable terminal 2 is connected to the site, and thus may receive the assistance for the program creation.

The portable terminal 2 is a portable terminal such as a smart phone or a tablet terminal. A hardware configuration of the portable terminal 2 will be described later with reference to FIG. 2.

Figure 2:
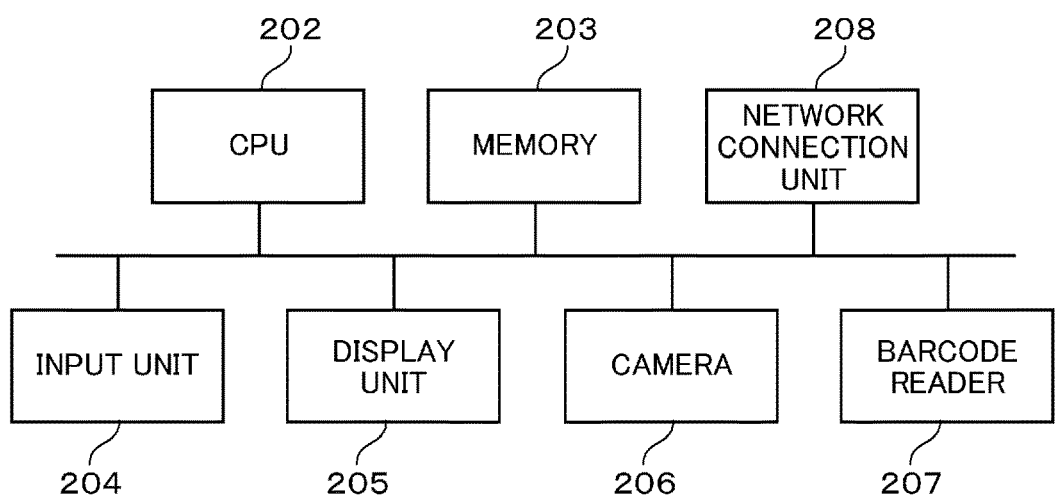
FIG. 2 is a diagram illustrating an example of a configuration of a portable terminal.

FIG. 2 illustrates the hardware configuration of the portable terminal 2.

The portable terminal 2 includes a processor (CPU) 202 that executes various application programs and the like, a memory 203 that stores data or programs, a screen-touch type input unit 204, a display unit 205 that displays a screen, a camera 206 having an image capturing function, a barcode reader 207 that reads a two-dimensional barcode, and a network connection unit 208 that performs a data communication with the server 1 through the network 9. The portable terminal may be connected to many sites through the Internet, and the CPU 202 executes an application desired by the user. In addition, the portable terminal has various functions including, for example, a sound input and output function in addition to the above functions.

[Task Sheet]

Figure 3A:
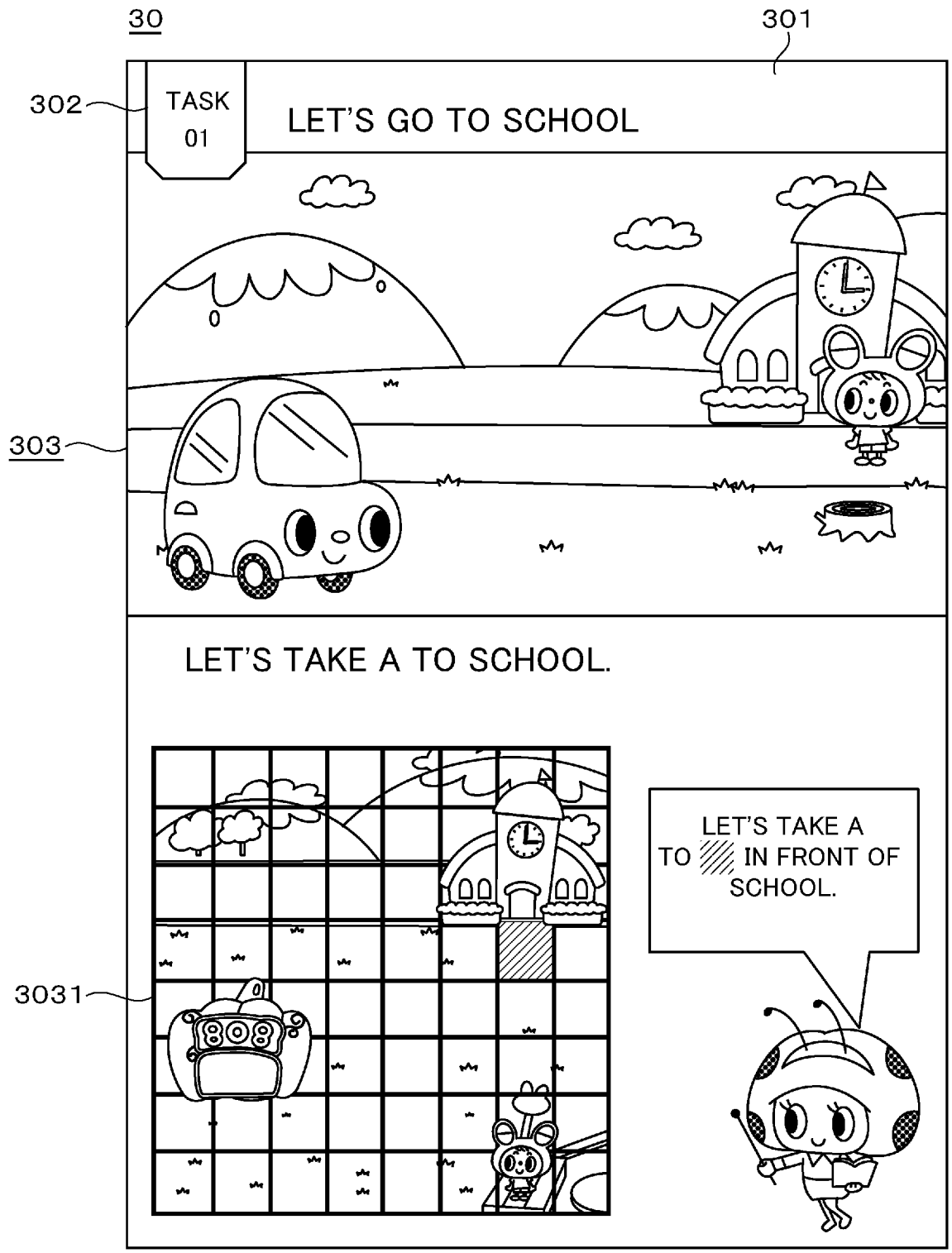
FIG. 3A is a diagram illustrating an example of a task sheet.
Figure 3B:
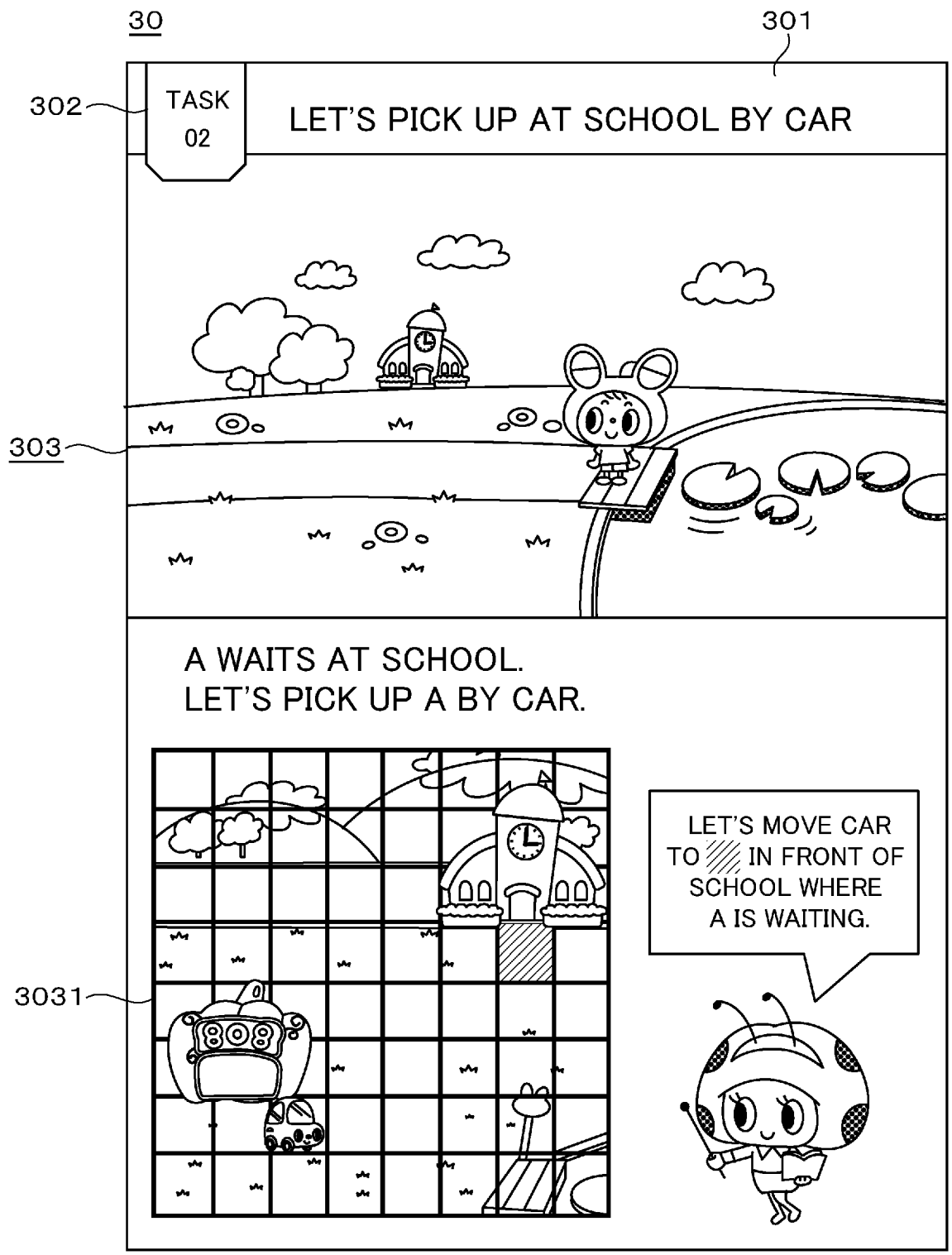
FIG. 3B is a diagram illustrating an example of the task sheet.

FIGS. 3A and 3B illustrate specific examples of the task sheet.

The task sheet is a sheet in which a task (may also be referred to a theme, a question, or a curriculum) for program creation to be made by the user is described. Another task sheet is distributed every time the task is different.

As illustrated in FIGS. 3A and 3B, a task sentence 301 and an explanatory pictorial diagram 303 are mainly described in a task sheet 30. In this example, a pictorial diagram 3031 of a map required in accordance with the task is drawn.

A task display portion 302 such as "01" or "02" is provided in order to manage the task (or task sheet). Unique identification information, which is different for each task, for example, a task number, is displayed in the task display portion 302. In the illustrated example, the content of a program differs in accordance with a task, for example, a task 01 indicates "Let's go to school", and a task 02 indicates "Let's pick up at school by car", and the pictorial diagram 303 also differs.

For example, in a class of a school or an institute, a teacher (user) distributes a task sheet 30 corresponding to a task to students every time the task changes. Thus, when the user uses the task sheet 30 (for example, in S1204), the user captures an image of the task number of the task sheet 30 with the camera 206 in the portable terminal 2. Thus, the task sheet 30 is associated with the task number registered in a task management table 80.

Note that, the task sheet may not be distributed to the user one by one, but a booklet including the task sheet 30 extending over a plurality of pages may be provided to the user for a fee or for free. In this case, the task display portion 302 may include site information of the server 1 that performs a program creation service, in addition to the task identification information. The user may cause the camera 206 in the portable terminal 2 to read the task display portion 302 in the task sheet 30, access the site of the program creation service based on the read information, acquire information registered in the task management table 80 (see FIG. 8) corresponding to the task sheet 30, and thereby receiving the program creation service.

As in this example, it is more practical to change the task sheet every time the task of program creation changes, like solving a test question. Incidentally, as disclosed in Patent Document 1, the identification portion 305 for identifying a curriculum is provided on the sheet in which chips are arranged. However, this method in the related art is troublesome because the sheet needs to be changed every time the curriculum changes. According to this example, the labor is saved because the sheet for arranging chips is not required. Additionally, every time a question is given, the task number of a task sheet is acquired using the camera in the portable terminal 2, and thus it is possible to easily associate the task of the question with a command by using the task management table.

[Chip]

FIGS. 4 and 5 illustrate examples of the chip used when a program is created.

Figure 5A:
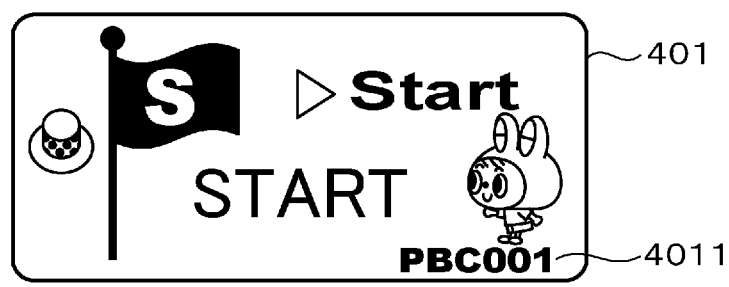
FIGS. 5A to 5C are diagrams illustrating an example of a start chip and an end chip.
Figure 5B:
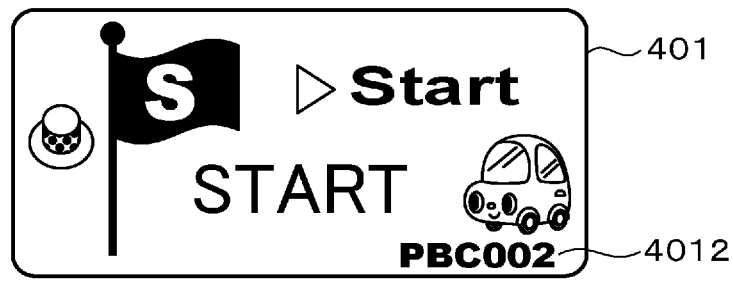
Figure 5C:
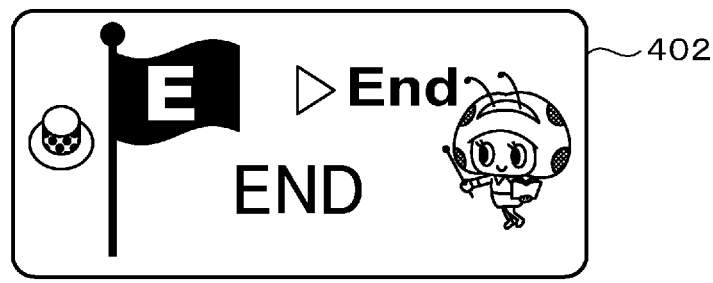

FIG. 4 illustrates a state where chips are arranged. FIGS. 5A to 5C illustrates the start chip and the end chip.

The chip is an indicator associated with a command of a program. For example, a chip is a plastic rectangular piece of about 2 cm in length×5 cm in width, in which the operation of the command is displayed (printed) with characters or a pattern (simply referred to as a pattern below). Each pattern differs for each command. Original information of the pattern of the chip 40 is stored as an image in the program DB 106.

The plurality of chips mainly include a start chip 401, an end chip 402, and a plurality of chips 4031 to 4036 (collectively indicated by 403) indicating general operations. The start chip 401 is disposed at the beginning of an array (chip array) of the plurality of chips. The end chip 402 is disposed at the end of the chip array. A pattern indicating the general operation is displayed on the chip 403 (in that sense, referred to as a general chip here). As the general chip 403, for example, a chip 4031 indicates moving to the right, chips 4032 and 4033 indicate moving to the left, chips 4034 and 4036 indicate move downward, and a chip 4035 indicates moving upward. As other general chip 403, chips illustrated in FIGS. 4 and 5 in Patent Document 1 may be assumed.

In processing of specifying a program command from the image of a chip array, which is captured by the camera 206 in the portable terminal 2, the image processing unit 104 in the server 1 recognizes the image of the start chip 401, and then sequentially recognizes the general chips 403. The program creation processing unit 103 converts the result of the recognition into a command. Then, if the image processing unit 104 recognizes the end chip 402, the program creation processing unit 103 ends the conversion into the command at this stage. Therefore, for example, command conversion of the general chip 4036 which is arranged after the end chip 402 is not performed. Therefore, it is necessary to inform the user of rules of chip array in advance.

As one feature in this example, as illustrated in FIGS. 5A to 5C, the task number 4011 or 4012 such as PBC001 or PBC002 is printed and displayed on the start chip 401. The task number 4011 or 4012 is associated with the task number in the task display portion 302 of the task sheet 30 and is further associated with a task management table 80 (described later with reference to FIG. 8) corresponding to the task number. The program creation processing unit 103 may refer to a relation between the image and the command registered in the task management table 80 to specify a command code forming a program based on the image of the pattern of a plurality of general chips 403 arranged between the start chip 401 and the end chip 402.

[Program Command and Command Table]

As the program command, as illustrated in FIG. 4, for example, "start" indicated by the start chip 401, "end" indicated by the end chip 402, and "move to right", "move to left", "move downward", "move upward", and the like as indicated by the general chips 403 are provided. For example, as in a command list shown in FIG. 7, a command table (indicated by the reference sign 50) includes nine commands (operation commands) representing display or movement, two commands (control commands) representing control sentences, four commands (input and output commands) representing an input or output, commands (parameters) representing parameters, that is, numerical values of 1 to 9, and other four commands.

The chip and the command uniquely correspond to each other. A relation between the pattern of the chip (that is, image of the pattern), the name of the command, a command operation, and the parameter is defined in the command table 50 as a correspondence table and is stored in the program DB 106. Here, unique code data (command code) corresponding to the image of the pattern is included in the command table 50 stored in the program DB 106. In this example, a plurality of commands (referred to as a command set) is selected with the task management table 80 in accordance with the task number acquired from the task sheet 30, finally, with reference to the command table 50.

Note that, when a new pattern of the chip or a new command is defined, or when the defined pattern is intended to be deleted or changed, the contents of the command table 50 may be changed. Regarding this, a correspondence relation between the pattern of the chip and the command in the command table 50 may be changed by an input instruction of an administrator from the input device (not illustrated) in the server 1 or the portable terminal 2.

Next, configurations of various management tables used for assisting program creation will be described with reference to FIGS. 8 to 10. The management tables 80 to 100 are stored in the management information DB 105.

[Task Management Table 80]

FIG. 8 shows an example of the configuration of the task management table.

The task management table 80 is a table in which the task of programming performed by the user and the command used in the task are associated with each other. With the task management table 80, the task number of the task sheet 30, the specific questions described in the task sheet 30, and the task number 4011 given to the start chip 401 are associated with each other, and finally, the images of a plurality of chips used in the task and the commands are associated with each other. Since the task management table 80 is constructed for each task, that is, for each task number, different plurality of task management tables 80 are created if a plurality of different tasks are provided.

As shown in FIG. 8, in the task management table 80, the task number as identification information unique to the task, an execution condition of an application used in the task, a character set representing a character used in the application, and reference numbers (number referring the command in the command table 50) of all commands which are selected from the command table 50 and are used in the task are registered. Here, the execution condition of the application is, for example, an address (for example, URL) for reading a program used in the task, and an operation condition of a character used in the program. The character is an image of a person who is used as a moving image in the execution of the program, and is, for example, an image of a rabbit or a turtle, or an image of a famous animation.

Here, the reason for registering the reference numbers of all the commands used in the task in the command set is to speed up program creation processing. That is, in the program creation processing, processing of recognizing the image of each chip from the image of the chip array is performed with reference to the command table 50. However, it takes a lot of time to scan all chip images registered in the command table 50 at this time. On the contrary, if the command corresponding to the reference number registered in the command set is scanned as a target, the time taken to recognize the image is largely reduced.

[User Management Table 90]

FIG. 9 shows an example of the configuration of the user management table.

The user management table 90 is a table for managing information of a user who creates a program. In the user management table 90, a user identification ID being user identification information, the name of the user, a program-data storing destination address indicating an address in which program data is stored, the task number acquired from the task sheet 30 used by the user, as task identification information, the update date and time, a mail address of the portable terminal held by the user as individual information, and the like are registered. In the task identification information, the task numbers previously used are sequentially registered as a log. In this example, the program-data storing destination address represents a program-data storing destination address designated by a program management table 100 for managing the created program data.

Note that, when program learning is performed in the class of a school or an institute, a data communication with the server 1 is performed using the portable terminal 2 held by the teacher. Thus, the teacher may be registered in the user management table as one user.

[Program Management Table 100]

FIG. 10 shows an example of the configuration of the program management table.

The program management table 100 is a table for managing information regarding the created program. In the program management table 100, the user identification ID of a user who has created the program, the task number, the created program data, the program-data storing destination address, the program registration date and time, and the correction date and time are registered. The program data refers to the created program. In the case of a program step with a plurality of lines, data corresponding to the number of lines is registered.

[Overall Operation of Program Creation]

Figure 11:
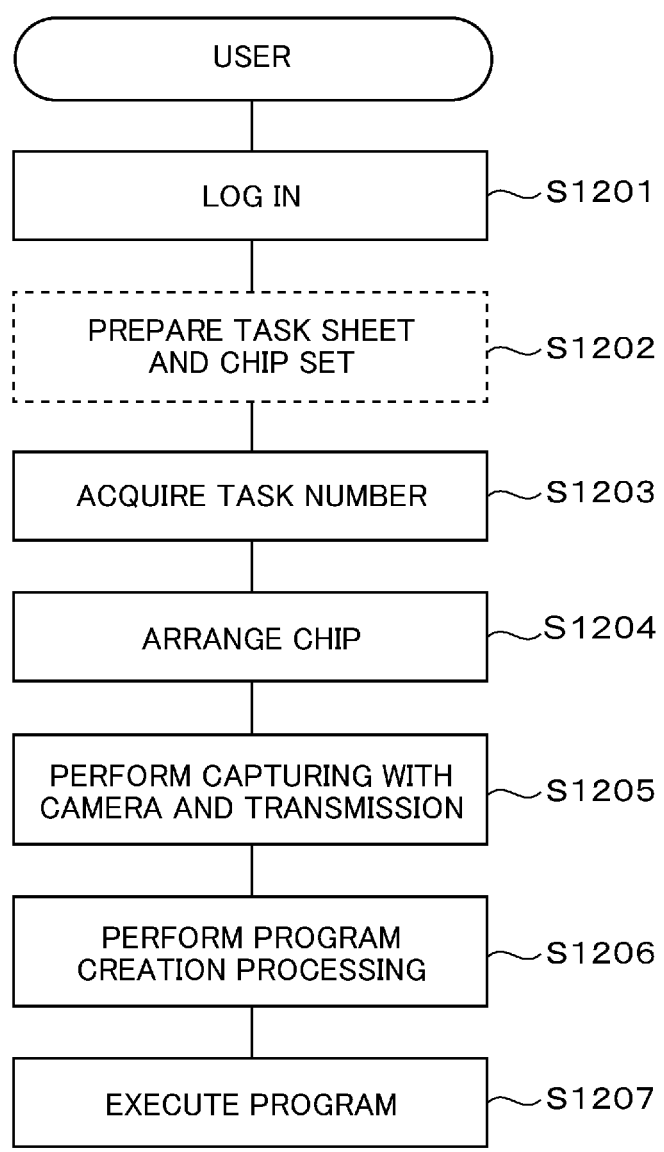
FIG. 11 is a flowchart schematically illustrating an operation of program creation.

Next, an overall operation of program creation will be described with reference to FIG. 11.

In this example, a flow when a user holding the portable terminal 2 performs programming is illustrated. In FIG. 11, a step indicated by a solid line represents a processing operation performed by the portable terminal or the server, and a step indicated by a dot line represents an operation of the user.

Firstly, the user performs log-in by operating the portable terminal 2 to input the account and password (S1201). Thus, the portable terminal 2 is connected to the server 1 via the network 9, and is connected to the site of the program creation in this case. The user also prepares a task sheet 30 and a set of a chip 40 (S1202). Note that, an order of S1201 and S1202 may be reversed.

Then, if the user operates the camera 206 in the portable terminal 2 to capture an image of the task display portion 302 in the task sheet 30, the CPU 202 in the portable terminal 2 recognizes the image of the task display portion 302, acquires the task number, and then stores the acquired task number in the memory 203 (S1203). Processing relating to the acquired task number will be described later.

Note that, a different task may be given to each of a plurality of students in the institute or the like. In this case, when the teacher distributes a plurality of different task sheets 30 to the students, the camera captures an image of the task display portion 302 in each of the plurality of task sheets 30, and the CPU 202 in the portable terminal 2 acquires the plurality of task numbers.

Then, the user performs programming, that is, a work of arranging the chips 40 in accordance with the description of the task sheet 30 (S1204). In this case, the user arranges a plurality of general chips 403 with the start chip 401 at the beginning, and disposes the end chip 402 at the end. Note that, in this example, the sheet for the chip array as disclosed in Patent Document 1 is not used. Thus, the array of the chip 40 does not form a straight line from the top to the bottom, for example, as in FIG. 4, and may be arranged to be shifted left and right. Even in this case, since the image processing unit 104 recognizes the images of the plurality of chips arranged between the start chip 401 and the end chip 402, there is no problem with a slight shift in a right-left direction.

If the work of arranging the chip 40 ends, the user captures the image of the array of the chip 40 with the camera 206 in the portable terminal 2. If the image of the array of the chip 40 is captured, the CPU 202 acquires the captured image of the chip array and transmits the acquired image to the server 1 (S1205).

In the server 1, the program creation processing is performed based on the received image (S1206). This processing will be described later in detail. The program created in the server 1 is executed in the portable terminal 2 (S1207).

Note that, the task number may be manually input from the input unit 204 in the portable terminal 2 in addition to being acquired from the task display portion 302 of the task sheet 30 with the camera 206 in the portable terminal 2 as in S1203. For example, after the portable terminal 2 is connected to the site, the user may visually recognize the task number displayed at the task display portion 302 of the task sheet 30 and manually input the task number with the input unit 204 in the portable terminal 2.

Here, in this example, the advantageous effect obtained by eliminating the sheet for the chip array sheet (disclosed in Patent Document 1) will be described. Regarding capturing (S1205) by the camera, in the program creation disclosed in Patent Document 1, the image of the chip array obtained by arrangement on the sheet is acquired by one capturing of the camera for each sheet. On the contrary, in this example, since the sheet for the chip array disclosed in Patent Document 1 is not required, the chip array is restricted by the sheet. The chip array becomes long when a complicated program is created. However, if the chip array is long, there is a possibility that it is not possible to acquire the image of the chip array by one capturing of the camera. Thus, in this example, as the measures, the capturing may be performed while sliding the camera 206 in the portable terminal 2 along the chip array (in a direction from the start chip to the end chip). For example, if a camera in a tablet terminal is used, the captured image of the chip array is sequentially displayed on the screen of the tablet terminal. In addition, the result of image recognition (image recognition for each chip) by the image processing unit 104 can also be sequentially displayed on the screen.

[Program Creation Processing]

Next, the program creation processing will be described with reference to FIGS. 12 and 13.

FIG. 12 illustrates an entire flowchart of the program creation processing.

Before this processing, the portable terminal 2 of the user accesses the site operated by the server 1, and thus individual information including the name of the user and the like is registered in the user management table 90. In addition, the task number acquired by the acquisition (S1203) of the task number in FIG. 11 is transmitted from the portable terminal 2 to the server 1 via the network connection unit 208. In the server 1, the information management unit 102 sets the task management table 80 corresponding to the task number to be in a standby state (for example, active flag (not illustrated) is turned on). Also, the information management unit 102 registers the task number of which the notification is received from the portable terminal 2, in the user management table 90.

At this time, it is assumed that the user has completed the array of the chip on the desk in accordance with the task sentence 301 and the explanatory pictorial diagram 303 in the task sheet 30.

The user operates the portable terminal 2 to log in (S1301). In this case, the information management unit 102 in the server 1 refers to the user management table 90, and then, when the task number is not registered, displays a screen for urging an input of the task number, in the display unit of the portable terminal 2. In this case, the user captures the image of the task number in a similar manner to Step S1203 (S1203'). Note that, when the log-in operation (S1201) has completed before the process of Step S1301, Step S1301 may be omitted.

After the log-in operation, the information management unit 102 in the server 1 activates an application program for program creation (S1302). If the application program is activated, the task management table 80 corresponding to the task number acquired from the task sheet 30 by the camera 206 in the portable terminal 2 is selected.

If the array of the chip 40 ends as described above, the user captures the image of the chip array with the camera 206 in the portable terminal 2. The captured image (chip array image) is temporarily stored in the memory 203 and is transmitted to the server 1 (S1303). The user identification ID is assigned to the image of the chip array, which is transmitted to the server.

If the server 1 receives the chip array image, the information management unit 102 checks whether an address of a transmission source is a mail address registered in the user management table 90. Further, the information management unit 102 checks whether the user identification ID assigned to the received chip array image is registered in the user management table 90. If the result of the check is correct, the process transitions to image processing and program creation processing.

In the program creation processing, firstly, the image processing unit 104 performs processing of recognizing the image of the pattern of the chip from the acquired chip array image (S1304). Then, the program creation processing unit 103 performs creation processing of a program based on the recognition result (S1305). The processing will be described later with reference to FIG. 13.

The program data created by the program creation processing unit 103 is stored in the program management table 100 in accordance with the processing of the information management unit 102. That is, in the program management table 100, the user identification ID who has created the program is registered in "user identification information", the task number relating to the programming is registered in "task identification information", the created program data is registered in "program", and the date and time when the program is stored is registered in "program registration date and time".

Then, the program registered in the program management table 100 may be executed (S1307). In one example, processing of testing and confirming the program is included at the stage before the program execution. This is because, for example, in the array of the chip 40, the chip of the control sentence or the chip of the parameter may be not arranged in accordance with a predetermined rule, or "END" may be not provided, and this causes an execution error of the program. If such an error is found in the test and confirmation processing, the process transitions to a work of correcting the program data.

That is, in order to test and confirm the program, the program data stored in the program management table 100 is transmitted to the portable terminal 2 as the transmission source via the network 9, and is executed by the CPU 202. The execution of the program by the CPU 202 is displayed in the display unit 205 with, for example, a motion image of a character registered in the task management table 80. The user sees the motion image displayed in the display unit 205 and determines whether the displayed motion image is correct, based on the "task" selected at first and the chip array in the chip array image acquired by the camera. As a result, when it is determined not to be correct, the process transitions to correction of the program. In this case, if an instruction to correct the program is input by the input unit 204, the instruction is transmitted to the server 1, and a flag (not shown) indicating being corrected is stored in the program management table 100. If the correction of programming by the user is ended, the corrected chip array image is transmitted to the server 1 in a similar manner to the above-described operation. In this case, the corrected program data (corrected version) is stored in the program management table 100 in the similar manner. Also, the correction date and time are registered in the program management table 100.

The corrected version program is executed by the portable terminal 2 in the similar manner to the above description. If an error does not occur as a result, the message indicating that the error does not occur is transmitted to the server 1, and a flag (not shown) indicating the completion of the program is registered in the program management table 100. Note that, the example of executing the completed program will be described later with reference to FIG. 14.

Next, the image processing (S1304) and the program creation processing (S1305) will be described in detail with reference to the flowchart in FIG. 13.

The image processing (S1304) is processing of recognizing and cutting out the image of the pattern drawn on each chip 40 from the chip array image. Since the image captured by the camera 206 is inclined, firstly, the inclination of the image of the chip array is corrected in processing of image correction (S1401).

Then, in image pattern matching (S1402), it is determined, with reference to the command table 50, whether the image of the pattern of each chip 40 forming the chip array matches with the image of the pattern registered in the command table 50. With this processing, the command code corresponding to the image of the pattern registered in the command table 50 is selected. As the feature of this example, if the image processing unit 104 recognizes the image of the start chip 401 included in the image of the chip array, firstly, the information management unit 102 (processing means) designates the task management table 80 corresponding to the task number 4011, based on the task number 4011 of the start chip 401. Further, the image processing unit 104 sequentially recognizes the images of a plurality of general chips 403 disposed after the start chip 401, and continues the recognition operation of the general chip until the image processing unit recognizes the image of the end chip 402. That is, the image processing unit performs pattern matching of the images of the general chips 403 disposed between the start chip 401 and the end chip 402.

The command code for the acquired image of the chip is sequentially selected from the command table 50 by the image pattern matching. In this example, comparison to all images registered in the command table 50 is not performed, but only the chip image corresponding to the command reference number firstly registered in the task management table 80 is compared as a target. Thus, speed-up of the processing time is achieved. Coordinate information of a place at which the image is recognized is added to the command code output as the result of the image pattern matching.

In the program creation processing (S1304), the command codes corresponding to the images of the patterns specified by the image processing are aligned (S1403). The reason for aligning the command code is that the image of the pattern recognized by the pattern matching is converted into the command code, but the array is still in a state where the chips 40 are arranged. Thus, the command code is rearranged and aligned. In this alignment, the command code is aligned with, for example, the Y coordinate as a reference, based on coordinate information added to the command code. Further when the program is created, it is checked whether the arrangement of the command code is correct, with reference to the command table 50. For example, as the result of the image processing, when the command code for the parameter of "number of times" is arranged on the right side of the command code "move", the arrangement is determined to be correct. When the parameter of "number of times" is arranged on the right side of the command code "pick up" or "place", this is not allowed in the command table 50, and the arrangement is determined to be incorrect. When the arrangement is incorrect, the parameter is ignored in one example. In addition, when the command code for the parameter is shifted to the right beyond the allowable range even though the arrangement of the parameter for the command code is correct, the command code is moved to the left side, and is aligned on the right side of the command code "move", for example.

When the alignment and confirmation of the command codes are ended, program codes are generated in the order of the aligned command codes to generate program data (S1404). The created program data is stored in an area "program" of the program management table 100. The user identification ID, the task number, and the program registration date and time are also registered in the program management table 100.

The program is created based on the array of the plurality of chips 40 by the processing operation.

[Execution of Program]

In Example 1, the created program is executed by the CPU 202 in the portable terminal 2 held by the teacher. The execution of the program is displayed on the screen of the display unit 205 as a motion image with the motion of the character. However, the execution is not limited thereto, and the program is executed by various devices.

Figure 14:
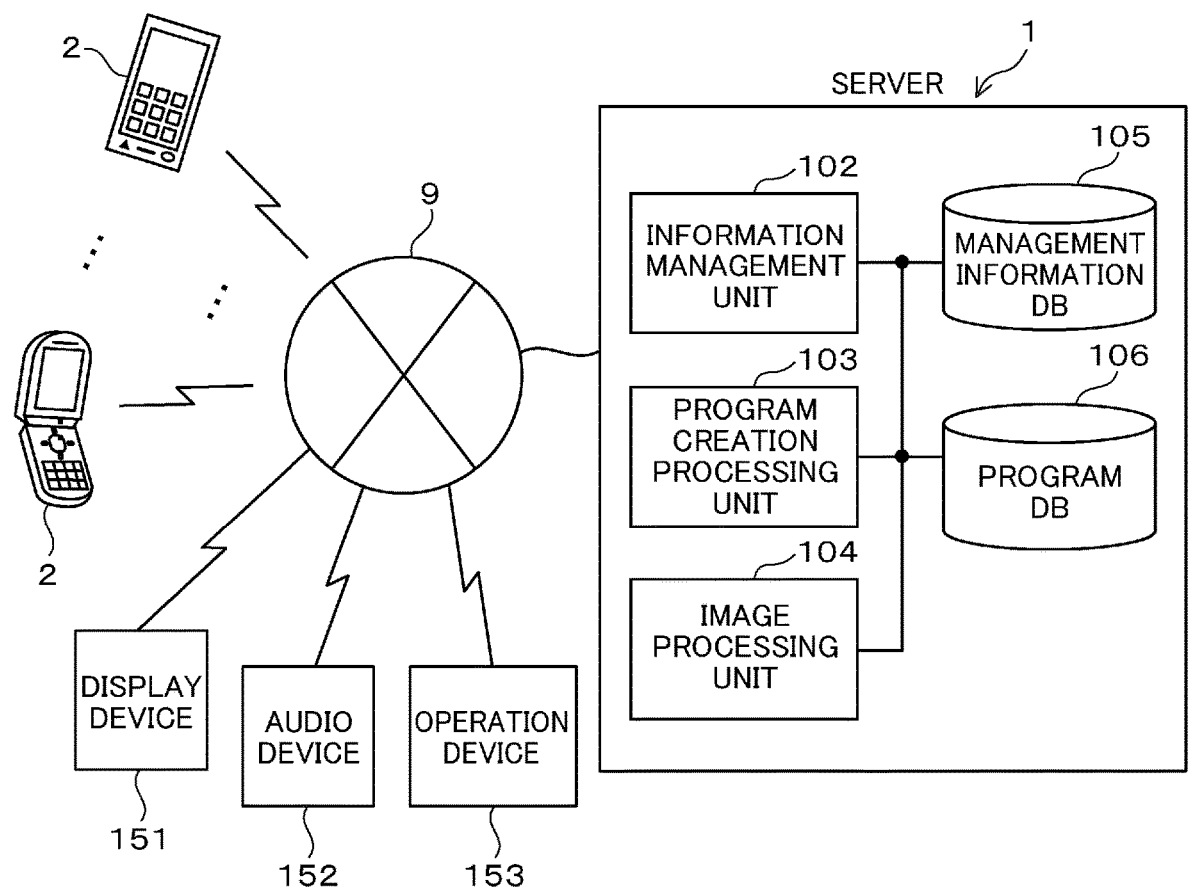
FIG. 14 is a diagram illustrating a configuration of a program execution system.

FIG. 14 illustrates the configuration of the program execution system connected to the program creation assisting system. A program execution device (simply referred to as an execution device below) such as a projector for projecting a motion image or a video on a screen, a large display device 151, an audio device 152, and an operation device 153 such as a robot or a minicar is connected to the server 1 forming the program creation assisting system, via the network 9.

The execution device in which the program is executed is not limited one and may be executed by a plurality of devices. For example, when "sound" is used from the input and output command in the command table, the operation of the character is displayed in the display device 151, and further a sound is generated from the audio device 152.

The execution device may be any device that has an IP address and can be connected to the Internet. Regarding the management of the execution device, an execution-device management table in which an IP address or a URL of a connectable device is registered is prepared in the management information DB 105 of the server 1, and the execution device as an output destination is selected with reference to the execution-device management table. In this manner, a connection to the device that executes the program is possible. The selection of the execution device may be determined in advance, or the execution device may be selected from the portable terminal 2 held by the user or another portable terminal after the program is completed.

[Example of Changing Task]

According to this example, the task may be changed only by changing the start chip 401.

For example, even though the task sheet is changed from the task 01 (FIG. 3A) to the task 02 (FIG. 3B), the task is changed in a manner that the array of the general chip 403 is not changed, and only the start chip 401 is changed from FIGS. 5A to 5B.

"Let's go to school" of the task 01 in the task sheet 30 illustrated in FIG. 3A is the case of programming an operation of "take A to school by walking". Meanwhile, "Let's pick up at school by car" of the task 02 in the task sheet 30 illustrated in FIG. 3B is the case of programming an operation of "go to school by car and come back". In any case, the road to the school is not changed. Thus, the array of the general chip 403 is not changed.

Example 2

Next, some modification examples or alternative examples to Example 1 will be described.

[Another Example of Designating Task Management Table]

In Example 1, the task number is acquired two times in order to be associated with the task management table. First, the task number is acquired by the camera 206 in the portable terminal 2 capturing the image of the task display portion 302 of the task sheet 30 (S1203). Second, the task number included in the start chip 401 is acquired at a stage in which the camera 206 in the portable terminal 2 captures the image of the chip array, and the image processing unit 104 recognizes the image of the start chip 401 included in the image of the chip array, from the image of the chip array (S1303).

According to another example, the task number may be acquired one time. For example, if the task number is acquired from the task display portion 302 of the task sheet 30, the start chip with the display of the task number is not required, and a general simple start chip may be provided. Meanwhile, if the start chip with the display of the task number is used, it is not required to acquire the task number from the task sheet 30.

[Another Example of Task Management Table]

In Example 1, the reference numbers (reference numbers of the commands selected from the command table 50 in FIGS. 5A to 5C) of all commands used by the task number are registered in the task management table 80. In another example, each type of data (that is, contents of the command table 50) of the image of the chip, the name, the operation, the parameter, and the command code for the command which is used by a certain task number and is selected from the command table 50 may be registered in the task management table corresponding to the task number.

[Another Example of Program Creation Assisting System]

In the program creation assisting system according to Example 1, the server 1 includes all the program creation processing unit 103 and the image processing unit 104, and the management information DB 105 and the program DB 106 that store the associated tables and information. Meanwhile, in a program creation assisting system according to Example 2, all or some of the processing functions or the DBs may be provided in the portable terminal 2.

For example, when all the processing functions and the associated tables and information are provided in the portable terminal 2, firstly, an access to the site (for example, site operated by the server 1) that performs the service of programming creation is performed, and thus the associated application (program creation function or associated management information) is downloaded and is held in the portable terminal 2. Then, the program can be created in a similar manner to the above example. The processing illustrated in FIGS. 11 to 13 is performed by a program in the CPU 202 of the portable terminal 2. For example, if the plurality of task management tables 800 are held in the memory 203 of the portable terminal 2, and the image processing unit realized by the processing of the CPU 202 recognizes the task number 4011 from the image of the start chip 401 included in the image of the chip array, the CPU 202 designates the task management table 80.

In addition, as an example in which some processing functions or DBs are provided in the portable terminal 2, for example, the command table 50 may be provided in the server 1, and the task management table 80, the image processing function, and the program creation function may be provided in the portable terminal 2. In this case, a set of the command used corresponding to the task number of the task sheet 30 and the chip image is acquired from the command table 50, registered in the task management table 80, and stored in the memory 203. When a plurality of different task sheets 30 (plurality of different task numbers) are used, a plurality of task management tables corresponding to the task numbers are prepared in the memory 203 of the portable terminal 2.

The program creation function may perform processing of specifying the command corresponding to the image of the chip with reference to the task management table 80 corresponding to the task number. Generally, portable terminals 2 of many users may be connected to the server 1. Thus, it is meaningful that all pairs of the commands and images are managed as a population in the command table 50, and the task management table 80 including the set of the command and the image selected from the command table 50 or an execution address and the like of the application in accordance with the task number designated by the request from the portable terminal 2 of the user is provided for the portable terminal 2.

[Another Example of Task Sheet]

In Example 1, the task sheet 30 is prepared as paper. According to the alternative example, the task sheet 30—may be provided by being displayed on the screen of the display unit 205 in the portable terminal 2 without preparing the sheet.

[Another Example of Start Chip and End Chip]

The characters and the patterns of the start chip 401 and the end chip 402 are not limited to those illustrated in FIGS. 5A to 5C. For example, the number "0" may be displayed on the start chip 401 instead of the character "start", and the number "100" may be displayed on the end chip 402 instead of the character "end". In short, the characters and the patterns that define the beginning and the end of the chip array may be determined in advance.

In addition, the task number is not limited to "number", and may be displayed in a form of a reference sign, a symbol, a pictorial diagram, or the like. In any case, a specific display associated with the task may be added.

[Another Example of Chip for Task Identification]

Figure 6A:
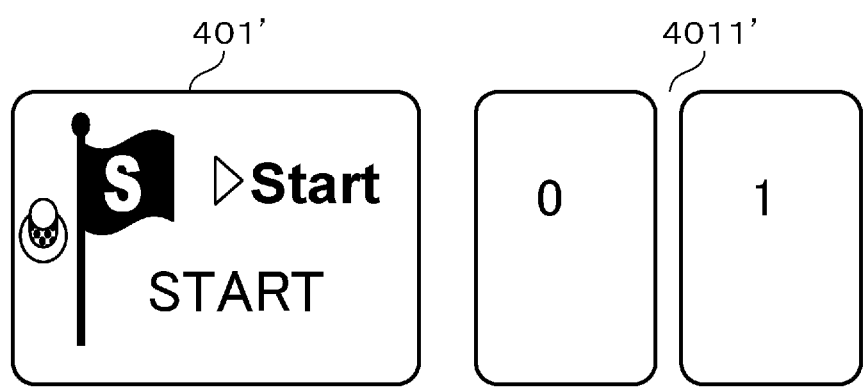
FIGS. 6A and 6B are diagrams illustrating another example of the chip array for task selection.

In Example 1, the task numbers 4011 and 4012 which are different for the tasks are displayed on the start chip 401 as the special chip for task identification unique to the task. According to the alternative example, the task number is not displayed on a start chip 401', and another expression format may be used for task identification. For example, as illustrated in FIG. 6A, the task number may be expressed by arranging two number chips 4011' next to the start chip 401'. In the example illustrated in FIG. 6A, the task number "01" is represented by the array (array of the number chips) of the numbers "0" and "1". If the array of the number chips changes, a different task number is obtained. In this case, the array of the number chips is set as the special chip.

Figure 6B:
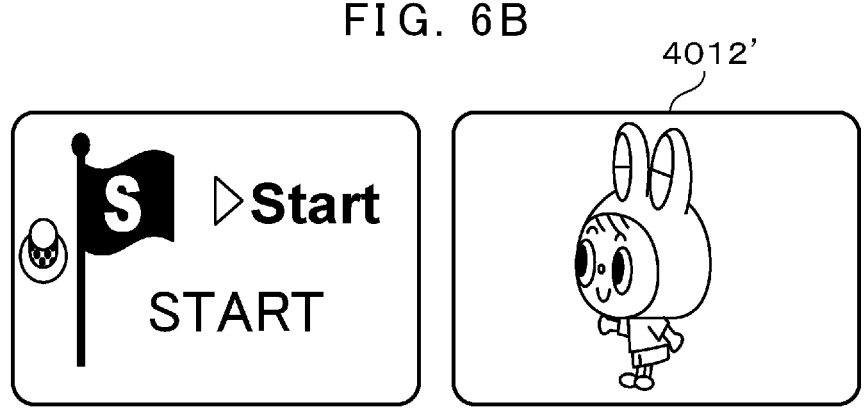

In addition, as illustrated in FIG. 6B, the task identification may be expressed by using a chip 4012' on which the character is displayed, as the special chip, instead of using the number chips. In this case, if the task changes, another special chip in which the character display changes is obtained.

Further, as another example, although not illustrated, the special chips 4011' and 4012' may be disposed after the start chip (in a chip array direction) instead of being disposed on the right side of the start chip (at a predetermined position) as in FIGS. 6A and 6B. Further, as another modification example, the special chip may be disposed before the end chip 402. Further, the special chip as in FIG. 6B may be disposed at any position between the start chip and the end chip. In any case, the image of the special chip and the position at which the special chip is disposed in the chip array may be realized by being defined in advance.

In Example 1, since the task number is assigned to the start chip 401, it is required to change the start chip every time the task changes. On the contrary, in the example illustrated in FIGS. 6A and 6B, even though the task changes, it is not required to change the start chip 401', and it is possible to easily handle the task change by changing the task identification chips 4011' and 4012'.

[Another Example of Chip]

As another example of the chip 40, the pattern, the shape, and the size of the chip 40 are not limited to those illustrated in FIGS. 4, 5, and 7. Regarding the pattern, the pattern is not limited to the abstract picture or character illustrated in FIG. 4. For example, the pattern may be a picture of a specific operation such as a rabbit running, rotating, or picking-up of an object. It is easier for elementary school children to understand the relation between the pictures and the meanings of commands. As another example, the pattern may be a trump or a carta. In addition, the shape of the chip is not limited to a quadrangle, but may be various shapes. For example, a shape obtained by cutting out a picture in which a rabbit runs, sleeps, or flies out may be provided.

In addition, regarding the name of the chip 40, in Example 1, the chip 40 is used, but the name is not limited thereto. For example, the chip may be referred to as a card, a part, a piece, a small piece, a piece of paper, an element, or may be collectively referred to as a component or an article.

The chip is preferably a flat card in consideration of arrangement, rearrangement, and storage, but the chip is not limited to the flat member. In short, the chip may be realized so long as the chip is an article that can be arranged, and that the characteristic (referred to as visual characteristics) of the pattern or the shape of the article is associated with the command. Note that, an article having visual characteristics may be referred to as a component having unique display.

In addition, in the above example, association with the command is performed by performing image recognition of the pattern of the chip 40. However, it is not limited thereto. For example, association with the command may also be performed by adding a unique number or barcode to each chip 40 in addition to the pattern, and recognizing the number or barcode. In this case, a relation between the number or barcode, and the command is registered in the command table.

Other Examples

In the above example, the task number displayed in the task display portion 302 of the task sheet 30 is acquired by the camera 206 in the portable terminal 2. In the alternative, the task display portion 302 may be formed by a two-dimensional bar code and be displayed in, for example, the right corner of the task sheet 30, and then the task display portion may be read by the barcode reader 207 in the portable terminal 2. In this manner, the task number may be acquired.

In addition, in the above example, the camera 206 of the portable terminal 2 captures the image of the chip array. According to the alternative example, the camera is not limited to the camera in the portable terminal, an image of the chip array captured by a camera having a communication function or a general digital camera may be stored in a USB memory or an SD memory, and the memory is mounted in a server or a terminal for program creation. In this manner, the image of the chip array may be acquired.

The present invention can be implemented with various modifications and applications other than the above examples and alternative examples.

REFERENCE SIGNS LIST

1 Server
2 Portable terminal
9 Network
102 Information management unit
103 Program creation processing unit
104 Image processing unit
105 Management information DB
106 Program DB
202 CPU
203 Memory
204 Input unit
205 Display unit
206 Camera
207 Barcode reader
208 Network connection unit
30 Task sheet
302 Task display portion
40 Chip
401 Start chip
402 End chip
4011, 4012 Task number
50 Command table
80 Task management table
90 User management table
100 Program management table

The invention claimed is:

1. A program creation assisting system for creating a program using a computer system, the program creation assisting system comprising:
  a camera that captures an image of a chip array in which
    a special chip having identification information unique to a task for programming is included, the chip array formed by an array of a plurality of chips having visual characteristics;

a task management table, in which the identification information and commands used for the task are associated with each other;

a memory storing at least one program;

a processor that executes the at least one program to configure the program creation assisting system to perform the steps of:

recognizing an image relating to a chip, from the image of the chip array, which is acquired by the camera;

selecting, when the identification information of the special chip is recognized in the recognizing step, a command corresponding to the image of the plurality of chips based on the task management table associated with the identification information of the special chip; and generating a program configured by a plurality of selected commands.

2. The program creation assisting system according to claim 1, wherein the special chip is a start chip that is disposed at a beginning of the chip array and on which the identification information unique to the task is displayed.

3. The program creation assisting system according to claim 1, wherein the chip array includes a start chip disposed at a beginning of the chip array and an end chip disposed at an end of the chip array, and the special chip is a chip that is disposed at any position between the start chip and the end chip in the chip array and has predetermined visual characteristics.

4. The program creation assisting system according to claim 1, further comprising:

a task sheet for assigning the task for programming and on which the identification information unique to the task is displayed, wherein the camera captures the image of the chip array formed by a user according to the task sheet.

5. The program creation assisting system according to claim 2, further comprising:

a plurality of the task management tables corresponding to a plurality of different identification information;

a plurality of start chips corresponding to a plurality of different identification information, unique identification information being given to each start chip is displayed; and the processor that executes the at least one program to configure the program creation assisting system to further perform the steps of:

including one start chip selected from the plurality of start chips in the chip array;

recognizing the identification information from an image of the one start chip in the chip array; and designating the corresponding task management table based on the identification information recognized from the one start chip.

6. The program creation assisting system according to claim 1, further comprising:

a command table registered in a state where an image of visual characteristics provided in the plurality of chips is associated with a command of a program, wherein the task management table stores a pair of the image selected from the command table to correspond to the identification information and the command.

7. The program creation assisting system according to claim 1, wherein a command table registered in a state where an image of visual characteristics provided in the plurality of chips is associated with a command of a program, and wherein the task management table stores reference information associated with a command which corresponds to the identification information and is in the command table.

8. The program creation assisting system according to claim 1, wherein the computer system includes:
a server; and
a terminal connected to the server via a network,
the server includes:
a storage unit that stores a plurality of the task management tables for a plurality of different identification information; and
the processor,
the terminal includes the camera, an input unit, a display unit, another processor, and a memory,
the memory stores at least one task management table selected from the plurality of the task management tables,
the generated program, generated by the processor in the server, is transmitted to the terminal,
the another processor in the terminal executes the generated program received from the server, and
the display unit displays a form of the execution of the generated program.

9. The program creation assisting system according to claim 1, wherein the computer system includes a terminal connected via a network,
the terminal includes the camera, an input unit, a display unit, the processor, and a memory,
the memory stores a plurality of the task management tables for a plurality of different identification information,
the generated program is executed by the processor, and
a form of the execution is displayed by the display unit.

10. The program creation assisting system according to claim 8, wherein an input of identification information corresponding to the task by the input unit in the terminal is enabled, and
the at least one task management table is selected by the input from the input unit.

11. A program creation assisting method for creating a program using a computer system, the program creation assisting method comprising the steps of:

capturing, with a camera, an image of a chip array in which a special chip having identification information unique a task for programming is included, the chip array formed by an array of a plurality of chips having visual characteristics;

managing the identification information and commands used for the task in association with each other, in a task management table;

recognizing an image relating to a chip, from the image of the chip array, which is acquired by the camera;

selecting, when the identification information of the special chip is recognized in the recognizing step, a command corresponding to the image of the plurality of chips based on the task management table associated with the identification information of the special chip; and generating a program configured by a plurality of selected commands.

12. The program creation assisting method according to claim 11, wherein
the special chip is a start chip that is disposed at a beginning of the chip array and on which the identification information unique to the task is displayed.

13. The program creation assisting method according to claim 11, further comprising:
preparing a task sheet for assigning the task for programming and on which the identification information unique to the task is displayed; and
wherein the camera captures the image of the chip array formed by a user according to the task sheet.

14. The program creation assisting method according to claim 12, wherein
a plurality of the task management tables corresponding to a plurality of different identification information are prepared,
a plurality of start chips corresponding to a plurality of different identification information are prepared, and unique identification information being given to each start chip are displayed,
the program creation assisting method further comprising the steps of:
including one start chip selected from the plurality of start chips in the chip array;
recognizing the identification information from an image of the one start chip in the chip array; and
designating the corresponding task management table based on the identification information recognized from the one start chip.

15. The program creation assisting method according to claim 11, wherein
a command table registered in a state where an image of visual characteristics provided in the plurality of chips is associated with a command of a program is provided, and
the task management table stores a pair of the image selected from the command table to correspond to the identification information and the command.

16. The program creation assisting method according to claim 11, wherein a command table registered in a state where an image of visual characteristics provided in the plurality of chips is associated with a command of a program is provided, and
the task management table stores reference information associated with a command which corresponds to the identification information and is in the command table.

17. The program creation assisting method according to claim 11, wherein
the computer system includes;
a server; and
a terminal connected to the server via a network,
the server includes;
a storage unit that stores a plurality of the task management tables for a plurality of different identification information; and
a processor,
the terminal includes the camera, an input unit, a display unit, another processor, and a memory,
the memory stores at least one task management table selected from the plurality of the task management tables,
the generated program is generated by the processor in the server and is transmitted to the terminal,
the another processor in the terminal executes the generated program received from the server, and
the display unit displays a form of the execution of the generated program.

18. The program creation assisting method according to claim 11, wherein the computer system includes a terminal connected via a network,
the terminal includes the camera, an input unit, a display unit, a processor, and a memory,
the memory stores a plurality of the task management tables for a plurality of different identification information,
the generated program is executed by the processor, and
a form of the execution is displayed by the display unit.

19. A non-transitory computer readable storage medium storing thereon a program creation assisting program for creating a program using a computer system, the program creation assisting program causing the computer system to perform the steps of:
managing the identification information and commands used for a task in association with each other, in a task management table;
acquiring an image obtained by a camera, the image being of a chip array and captured by the camera, the chip array including a special chip having identification information unique to a task for programming, the chip array formed by an array of a plurality of chips having visual characteristics;
recognizing the an image relating to a chip, from the acquired image of the chip array;
selecting, when the identification information of the special chip is recognized in the recognizing step, a command corresponding to the image of the plurality of chips based on the task management table associated with the identification information of the special chip; and
generating a program configured by a plurality of selected commands.

* * * * *